(12) United States Patent
Mawby et al.

(10) Patent No.: US 8,978,458 B2
(45) Date of Patent: Mar. 17, 2015

(54) TIRE UNIFORMITY THROUGH IDENTIFICATION OF PROCESS EFFECTS USING SINGLET TIRE REGRESSION ANALYSIS

(75) Inventors: William David Mawby, Greenville, SC (US); Jonathan Sauls, Simpsonville, SC (US)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 265 days.

(21) Appl. No.: 13/807,503

(22) PCT Filed: Mar. 30, 2011

(86) PCT No.: PCT/US2011/030467
§ 371 (c)(1),
(2), (4) Date: Dec. 28, 2012

(87) PCT Pub. No.: WO2012/003022
PCT Pub. Date: Jan. 5, 2012

(65) Prior Publication Data
US 2013/0098148 A1   Apr. 25, 2013

(30) Foreign Application Priority Data
Jun. 30, 2010  (WO) ................ PCT/US2010/040561

(51) Int. Cl.
*G01M 17/02* (2006.01)
*B60C 23/02* (2006.01)
*B29D 30/06* (2006.01)

(52) U.S. Cl.
CPC ....... *G01M 17/02* (2013.01); *B29D 2030/0635* (2013.01)
USPC ........................................... 73/146; 73/146.5

(58) Field of Classification Search
USPC ................................. 73/146–146.5
See application file for complete search history.

(56) References Cited

U.S. PATENT DOCUMENTS 4,936,054 A   6/1990   Rogers et al.
6,856,929 B1  2/2005   Mawby et al.
(Continued)

FOREIGN PATENT DOCUMENTS

WO   WO 2007/076149 A2   7/2007
WO   WO 2010/071657 A1   6/2010

OTHER PUBLICATIONS

PCT International Search Report and Written Opinion for PCT/US2011/040561, dated Jun. 13, 2011.
PCT International Search Report and Written Opinion for PCT/US2010/030467, dated Aug. 31, 2010.
Algebralab, "Introduction to Vectors", 2003-2011, entire document http://www.algebralab.org/lessons/lesson.aspx?file=Trigonometry_TrigVectorIntro.xml.
(Continued)

*Primary Examiner* — Andre Allen
(74) *Attorney, Agent, or Firm* — Dority & Manning, P.A.

(57) ABSTRACT

A system and related method for improving tire uniformity includes identifying at least one candidate process effect and a corresponding process harmonic number for each process effect. A given uniformity parameter, such as radial or lateral run-out, balance, mass variation, radial lateral or tangential force variation, is measured for each tire in a test set, such that the measurements contain tire harmonics as well as a process harmonics corresponding to each candidate process effect. Rectangular coordinate coefficients are electronically constructed for each said process harmonic, after which point the rectangular coordinates corresponding to each process harmonic are solved for (e.g., by using regression-based analysis). The magnitude of each said process harmonic is estimated, and a final magnitude estimate for each process harmonic can be determined by summarizing (e.g., by taking the average or median value) the respectively estimated magnitudes for each process harmonic across all test tires.

20 Claims, 10 Drawing Sheets

(56) References Cited

U.S. PATENT DOCUMENTS

| | | | |
|---|---|---|---|
| 8,718,990 B2* | 5/2014 | Song et al. | 703/7 |
| 2006/0123898 A9 | 6/2006 | Zhu | |
| 2008/0011074 A1 | 1/2008 | Braghiroli | |
| 2012/0035757 A1* | 2/2012 | Mawby et al. | 700/104 |
| 2013/0090879 A1* | 4/2013 | Estor et al. | 702/97 |
| 2013/0253686 A1* | 9/2013 | Flament et al. | 700/117 |

OTHER PUBLICATIONS

Lucko et al. "Statistical Considerations for Predicting Residual Value of Heavy Equipment", Journal of Construction Engineering and Management 132(7). 2006, entire document—pp. 723-732, http://faculty.cua.edu/lucko/docs/2006_Lucko_Anderson-Cook_Vorster_statistical_considerations_for_predicting_residual.pdf.

* cited by examiner

TIRE UNIFORMITY THROUGH IDENTIFICATION OF PROCESS EFFECTS USING SINGLET TIRE REGRESSION ANALYSIS

PRIORITY CLAIM

This application claims priority to PCT Patent Application No. PCT/US2010/040561, filed on Jun. 30, 2010, and having the same inventors and title as present.

FIELD OF THE INVENTION

The invention relates to tire uniformity, and more specifically to a method for estimating the magnitude of candidate process harmonics in a measured uniformity waveform. Such estimates then may be used for analyzing and controlling the uniformity of tires during and after tire manufacturing.

BACKGROUND OF THE INVENTION

Tire non-uniformity relates to the symmetry (or lack of symmetry) relative to the tire's axis of rotation in mass, geometric or stiffness characteristics. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Many different factors can contribute to the presence of non-uniformities in tires, even when the tires are built under seemingly identical process conditions. Examples of such factors include the location of product start points and/or joint overlap locations for one or more of the many complex tire building products and/or steps. Exemplary products include the casing textile plies, the belt plies, bead rings, the inner liner, the tread and other rubber layers. Steps involving these and other products include the application of such products to a form or drum, placing the resulting green structure in a mold or press and subjecting the structure to heat and pressure to shape and cure the rubber products and bond the materials into an integrated unit.

Tire uniformity characteristics, or attributes, are generally categorized as dimensional or geometric variations (radial run out (RRO) and lateral run out (LRO)), mass variance, and rolling force variations (radial force variation, lateral force variation and tangential force variation, sometimes also called longitudinal or fore and aft force variation). Uniformity measurement machines often calculate the above and other uniformity characteristics by measuring force at a number of points around a tire as the tire is rotated about its axis.

The respective tire harmonics obtained from a measured uniformity waveform can be analyzed in accordance with known processing techniques in order to improve uniformity. One example of improving uniformity is implemented by altering the relative angular position of known manufacturing components in a tire to reduce the magnitude of the measured uniformity parameter for one or more tire harmonics of interest. However, this type of uniformity analysis may be hindered by the impact of process effects whose periodic contributions to the composite uniformity waveform are not identical to the tire harmonics, resulting in poorer compensations and adjustments. In fact, locating and estimating the magnitude of process harmonics can be difficult using standard techniques for analyzing tire harmonics such as Fourier analysis. Identification of such uniformity contributions can help improve uniformity analysis as well as the tire building process. Although known technologies for tire uniformity improvement have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved system and methodology has been provided to improve uniformity in tires. Such methodology generally involves steps by which the magnitude of one or more process harmonics can be estimated. The estimated process harmonic magnitude(s) can then be used to better analyze a measured uniformity parameter and determine the uniformity contributions from tire harmonics versus process harmonics. This analysis can ultimately lead to improvements in the tire characterization and/or manufacturing processes.

The test tires, even when manufactured under like conditions, are subject to uniformity dispersion due to both tire effects (i.e., variations that manifest themselves as harmonic components of a uniformity measurement that have a period that fits some integral number of times within one tire circumference) as well as process effects (i.e., hidden or neglected periodic effects that do not have periods that fit an integral number of times within one tire circumference.) Examples of tire effects include those due to tire material components (e.g., the product start point or joint overlap location of one or more of casing textile plies, belt plies, bead rings, inner liner, tread and other rubber layers of the tires), manufacturing techniques (e.g., the relative location in which a green tire is introduced on a building drum, placed into a mold or curing press, and the like), and/or controllable conditions used in the tire construction process (e.g., the temperature and pressure at which green tires are subjected during the curing process or other manufacturing steps.) Examples of process effects may arise from such manufacturing conditions as a roller influence, extruder surge, fluctuation in a process condition (e.g., temperature, pressure, speed, etc.) and others. The impact of tire effects and process effects within a measured uniformity waveform are respectively represented by "tire harmonic" or "process harmonic" components of the composite waveform. It is usually desirable to know the relative angular location within each tire of certain tire effects as well as the harmonic number of a process effect.

The subject technology also involves measuring a given uniformity parameter, for each tire in a set of test tires. For example, such uniformity parameters may selectively include one or more of radial run out (RRO), lateral run out (LRO), balance, mass variance, radial force variation (RFV), lateral force variation (LFV) and tangential force variation (TFV). In some examples, the measured values correspond to a composite waveform comprised of a plurality of data points measured circumferentially around a tire, where the composite waveform contains tire harmonics as well as process harmonics corresponding to each candidate process effect. Rectangular coordinate coefficients are electronically constructed for each said process harmonic, after which point the rectangular coordinates corresponding to each process harmonic are solved for (e.g., by using regression-based analysis). The regression-based analysis may be conducted using the raw data of the composite uniformity waveform, or it may be conducted using data that has been filtered to remove some or all of the tire harmonics from the raw data. Once the rectangular coordinates for each process harmonic are estimated, the magnitude of each process harmonic is calculated, and a final magnitude estimate for each process harmonic can be determined by summarizing (e.g., by taking the average or median value of) the respectively estimated magnitudes for each process harmonic across all test tires.

In additional exemplary embodiments, once the magnitude of process harmonics is determined, the process harmonics can be separated from the tire harmonics, and new tires can be built to improve uniformity based on such knowledge. For example, angular locations of material components contributing to tire effects can be altered relative to the location of a process effect (which may be tracked through multiple tires using a sensor) so that the combined average magnitude of the tire and process effects is reduced. In addition, separation of the process and tire harmonic(s) can also be used to provide filtered uniformity measurements focusing just on the tire harmonics or the process harmonics. In this way, the angular location of components contributing to tire harmonics can be optimized without the process effects interfering with such optimization, or vice versa.

In other additional exemplary embodiments, the subject analysis can be applied to a plurality of distinct groups of tires, where each group has a different characteristic (e.g., circumference, spring rate) from other groups, but all groups are made in a similar manufacturing process such that the same candidate process effect will manifest in a cured tire in a similar manner. A given candidate process effect could thus have slightly different harmonic numbers for each distinct group of tires. Because of this difference, the magnitude of each process harmonic estimated within each group of tires will be slightly different, requiring a final magnitude estimate that takes such differences into account. In some particular examples, a final magnitude estimate comprises determining a weighted average of resulting final magnitude estimates from each distinct tire group in the set of one or more test tires. The weighted average across all distinct tire groups may account for the number of tires in each group as well as a tire spring constant applicable to each group.

In addition to various methodologies, it is to be understood that the present subject matter equally relates to associated systems, including various hardware and/or software components that may be provided in a tire manufacturing and measurement system. In one exemplary embodiment, the present subject matter concerns a system for improving the uniformity of tires, including manufacturing components as well as modeling components.

The manufacturing components are part of a tire construction system that builds tires in accordance with known techniques such that one or more process elements are positioned in accordance with particular angular locations relative to a reference point on each tire. The fixed location of each tire effect is known within tires, and the changing location of each process effect as it is periodically introduced over a plurality of tires is tracked (e.g., using a sensor). This knowledge of effect location and period helps facilitate improvements in the tire building process. Information related to such improvements can be either provided as a displayed output to a user or fed back in a control loop to the manufacturing process such that the improved process element locations can be implemented in subsequent tire construction.

In one exemplary embodiment, modeling/processing components of the tire measurement system include a first memory/media element adapted for storing a plurality of data points for one or more measured uniformity parameters for a set of test tires. Such uniformity data points may include at least one identified process harmonic. A second memory/media element is adapted for storing software in the form of computer-executable instructions. At least one processor is coupled to the first and second memories and configured to selectively implement the computer-executable instructions stored in the second memory to process the measurements and other data stored in the first memory. A third memory/media element may also be provided for storing output data to provide to a user or for subsequent processing or feedback control.

In a particular embodiment of the above tire measurement system, the one or more processors implement the computer-executable instructions stored in memory in order to construct rectangular coordinate coefficients for each said process harmonic, solve for the rectangular coordinates corresponding to each said process harmonic for each test tire, estimate the magnitude of each said process harmonic, and determine a final magnitude estimate for each said process harmonic by summarizing the respectively estimated magnitudes for each said process harmonic across all test tires.

It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1A:
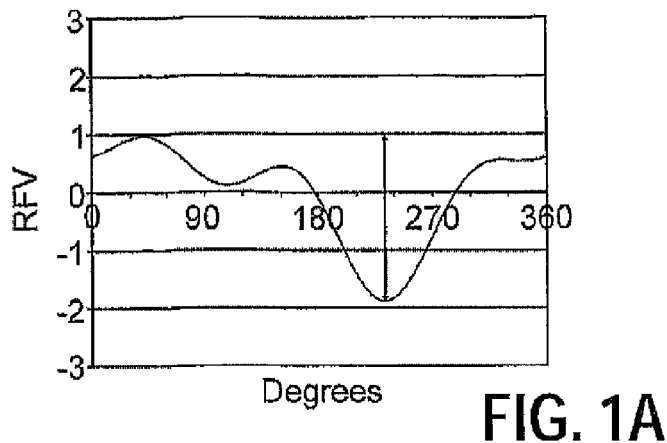
FIGS. 1A through 1C, respectively, depict schematic representations of a uniformity measurement of the radial force variation of a tire showing the original composite waveform as well as respective first and second harmonic components.

Repeat use of reference characters throughout the present specification and appended drawings is intended to represent same or analogous features, elements or steps of the present invention.

DETAILED DESCRIPTION OF THE PREFERRED EMBODIMENTS

As discussed above, the present subject matter is particularly concerned with a system and method for improving tire uniformity by identifying different causes of uniformity, including those due to process harmonics (i.e., cyclic elements in the tire manufacturing process whose effects are not identical in wavelength to any particular tire harmonic.) Identification of the uniformity contributions from process harmonics can help improve uniformity analysis as well as the tire building process.

In analyzing tire uniformity, a variety of different uniformity parameters may be measured. Examples of such uniformity parameters may include but are not limited to one or more of the following: radial run out (RRO), lateral run out (LRO), mass variance (e.g., uneven mass distribution), balance, radial force variation (RFV), lateral force variation (LFV) and tangential force variation (TFV). When one of such parameters is measured in accordance with uniformity analysis, the parameter is usually measured at a number of data points around a tire as the tire is rotated about its axis. The obtained measurements generally correspond to a composite waveform representative of tire uniformity, which can be decomposed into many respective harmonic contributions.

As an example, consider that it is desired to measure and analyze the radial force variation (RFV) for a given set of test tires. FIG. 1A shows a schematic of the measured RFV for a cured tire. The abscissa represents the circumference of the tire and the ordinate the radial force variations. FIG. 1A is the as-measured signal and is referred to as a composite waveform. The composite waveform may comprise a large number of combined tire harmonics. The individual tire harmonics may be obtained by applying Fourier decomposition to the composite signal.

Figure 1B:
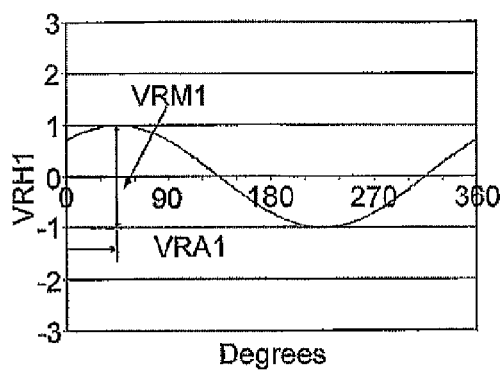
Figure 1B:
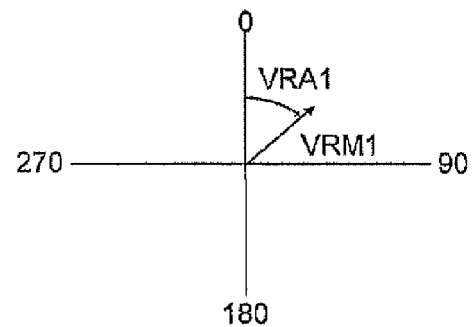
Figure 1C:
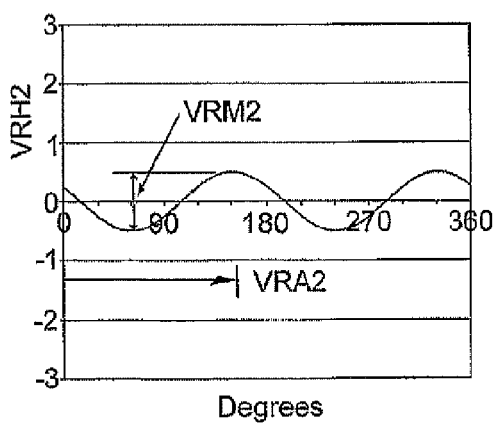
Figure 1C:
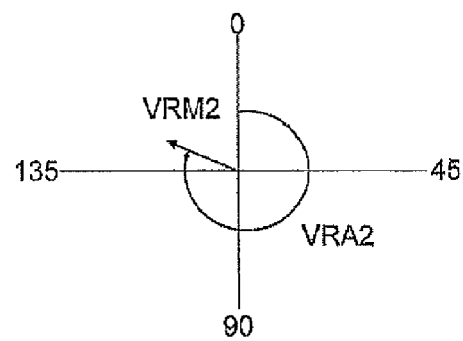

FIGS. 1B and 1C depict the resulting first and second tire harmonics (VRH1 and VRH2), respectively, extracted from the composite signal. The magnitude of the first harmonic of radial force VRM1 is defined as the difference between the maximum and minimum force. The phase angle or azimuth of the first harmonic VRA1 is defined as the angular offset between the reference location for the measurement and the location of maximum radial force. Thus, the sine wave depicted by Cartesian coordinates in FIG. 1B can be equally shown as a vector in the polar coordinate scheme. Such a vector plot is shown in FIG. 1C immediately to the right of the sine wave plot. The RFV vector of the first harmonic VRH1 has a length equal to VRM1 and is rotated at an angle equal to the azimuth VRA1. In a similar manner, one can extract the second harmonic vector VRH2 shown in FIG. 1C that has a force magnitude VRM2 and an azimuth VRA2. The corresponding polar plot for the H2 vector resembles the H1 vector, except that the angular coordinate is now two times the azimuth angle.

In analyzing the above tire harmonics, it is significant to note that there will be some variation in the decomposed harmonic vectors, even when tires are built under seemingly identical process conditions. This can be seen by obtaining a population of uniformity vectors by measuring and decomposing the uniformity harmonics for a plurality of test tires. Such a population of vectors can then be averaged to obtain a mean vector representative of the average uniformity value for a population of tires.

Figure 2:
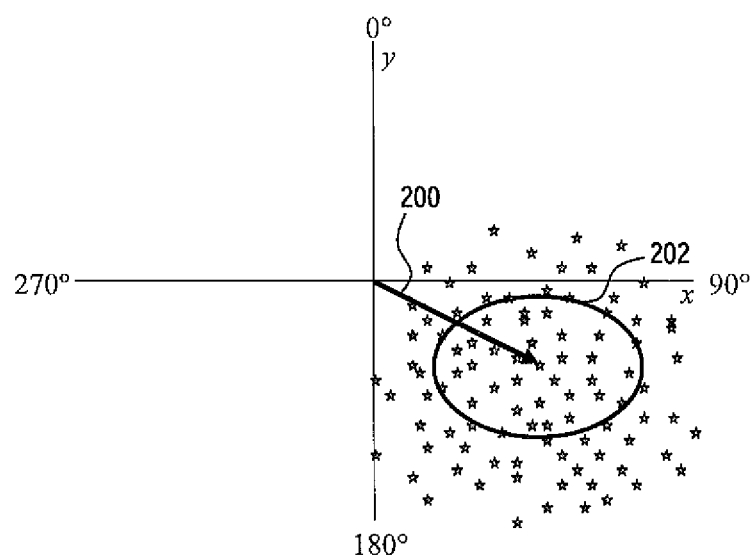
FIG. 2 is a vector plot of a data set of an exemplary measured uniformity parameter for multiple respective tires, including an average vector and dispersion area resulting from the measured data set.

For example, consider FIG. 2 which shows a population of measurement vectors, where each star in the drawing represents a measurement obtained for a different tire. The magnitude of each vector is the distance the star is from the origin, and the azimuth is the angle from the x-axis (0°). The mean, or average, vector of the population of VRH1 vectors shown in FIG. 2 is represented by the ray 200 starting at the origin and extending outwards at an angular position of about 130°. Dispersion is represented as the scatter of the individual tire vectors around the average vector 200. One way to mathematically represent the amount of scatter of the individual vectors is by the area of the standard ellipse, shown as area 202 in FIG. 2.

The sources of the dispersion represented by the scatter in FIG. 2 can come from many different sources. Some sources of uniformity dispersion stem from variations in the material components that are used in construction of a tire (e.g., different product start points or joint overlap locations of layered materials such as but not limited to textile plies, bead rings, inner liners, tread portions and other rubber layers that are combined to form the tire carcass, belt and summit portions), differences in manufacturing techniques that are used in tire construction (e.g., the relative location in which a tire is loaded into a curing press), and even variations in controllable conditions such as temperature and pressure that affect the tire building process. Most of the above types of variations will usually show themselves as so-called "tire harmonics," meaning that such variations will correspond to harmonic components of a uniformity measurement that have a period that fits some integral number of times within one tire circumference.

Figure 3:
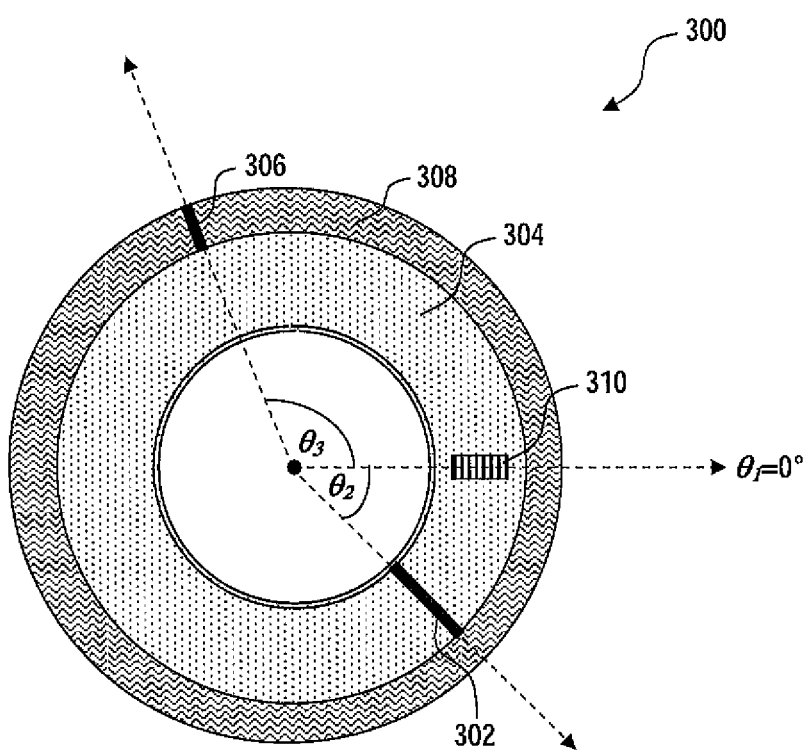
FIG. 3 provides a component representation of an exemplary tire and corresponding process elements which might contribute to tire harmonics and whose angular locations might be optimized to compensate for process harmonic effects in accordance with aspects of the present invention.

An example of tire manufacturing components that present themselves as tire harmonics in a uniformity measurement is illustrated in FIG. 3. In particular, the process elements that contribute tire harmonics to a uniformity measurement taken relative to tire 300 include joint 302 of first tire layer 304 and joint 306 of second tire layer 308. The relative locations of the joints 302 and 306 (i.e., $\theta_2$ and $\theta_3$, respectively) are usually known relative to some visual reference point on the tire, for example bar code 310 located at $\theta_1=0°$. If tires are attempted to be manufactured under similar conditions, then each of the multiple tires in a batch of constructed tires would have one uniformity contribution from each joint 302 and 306 for each single tire rotation. As such, these uniformity contributions would be considered tire harmonics. However, not all uniformity contributions are consistently introduced once per tire circumference.

Another source of the dispersion represented by the scatter in FIG. 2 can stein from hidden or neglected periodic effects, but now, these effects manifest themselves in tire measurements as process harmonics that are not necessarily matched to tire harmonics. That is, these process harmonics are still periodic in nature, but they do not have periods that fit an integral number of times within one tire circumference. One may say that they are harmonics of the process rather than harmonics of the tire. As such, tire variations stemming from known or unknown contributions due to the manufacturing process are referred to herein as "process harmonics."

Figure 4A:
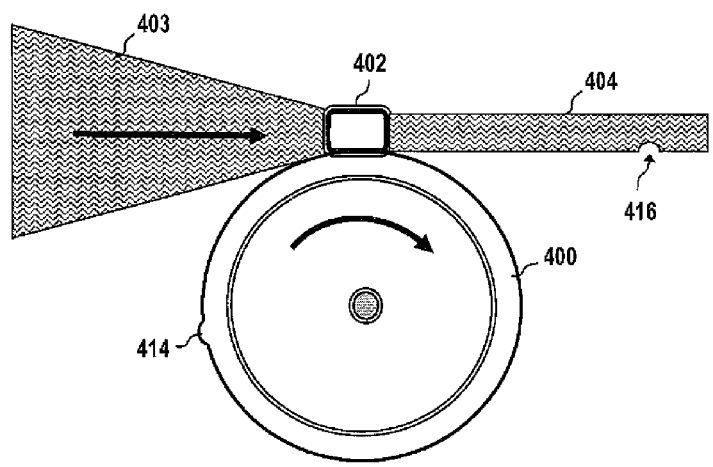
FIG. 4A provides a schematic representation of exemplary tread building components, including a non-uniform roller that periodically imparts a process effect into consecutively built tires.
Figure 4B:
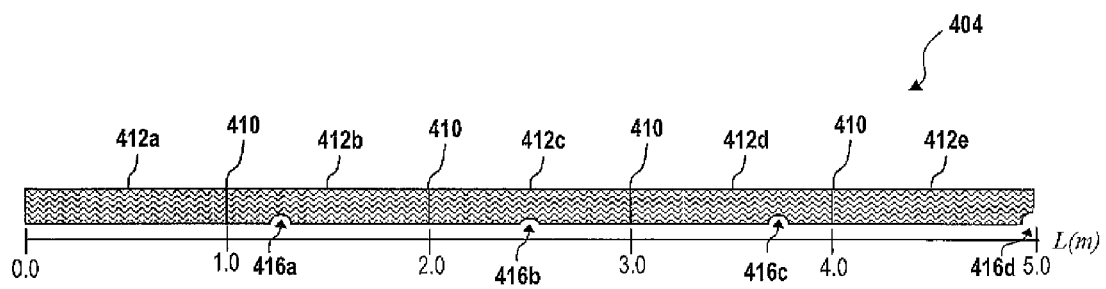
FIG. 4B depicts schematically a tread layer with periodically introduced process effects that would be imparted into five exemplary consecutively built tires, where the abscissa in such schematic represents the length (L) in meters (in) of the tread layer.

Examples of process effects that give rise to process harmonics may include manufacturing conditions as a roller influence, extruder surge, fluctuation in a process condition (e.g., temperature, pressure, speed, etc.) and others. A specific example representing the contribution of a process effect due to a localized anomaly periodically introduced by a roller non-uniformity is depicted in FIGS. 4A and 4B. Consider roller 400 and extruder 402 which are positioned next to one another and function together to form a particular layer for use in constructing tires. In one example, rubber 403 is fed into extruder 402 and formed along roller 400 such that a continuous band of tread portion 404 is created. This elongated tread portion 404 is eventually cut into different portions which are used to construct the respective tread layers of a series of manufactured tires.

Referring more particularly to FIG. 4B, consider tread portion 404 with length (L) measured in meters (m) being used to form the tread layers in five consecutively manufactured tires, each having a tread circumference of about 1.0 meter. As such, tread portion 404 will be cut at respective locations 410 to create tread sections 412a, 412b, 412c, 412d and 412e, each characterized by a length of about one meter. Now consider that the roller 400 from FIG. 4A had a bump 414 that imparted a slight variation 416 to the tread portion 404 every 1.25 meters. This process effect would thus show up periodically in the tread portion 404 and at different positions within a series of consecutively cut tread sections as explained below.

For example, consider a first introduction 416a of a process effect due to roller condition 414 being located at 1.25 meters, which is 1.25 meters from the beginning of tread section 412a and 0.25 meters from the beginning of tread section 412b. The second introduction 416b of the process effect due to roller condition 414 would then be located at 2.5 meters, which is 0.5 meters from the beginning of tread section 412c. The third introduction 416c of the process effect due to roller condition 414 would be located at 3.75 meters, which is 0.75 meters from the beginning of tread section 412d. The fourth introduction 416d of the process effect due to roller condition 414 would be located at 5.0 meters, which is at the end of tread section 412e. Although only five consecutive tread portions are shown in FIG. 4B, this periodically repeating trend of the roller process effect continues through additional tires in a consecutively manufactured series.

It is clear from the location of the particular process effect identified in FIGS. 4A and 4B that the effect is not located in the same position, if at all, in every tire. Since such effect does not consistently show itself once per tire circumference (e.g., once every 1.0 meters), it will not be considered a so-called "tire harmonic" but instead a "process harmonic" having a different frequency of introduction relative to the circumference of manufactured tires (e.g., once every 1.25 meters).

Figure 5:
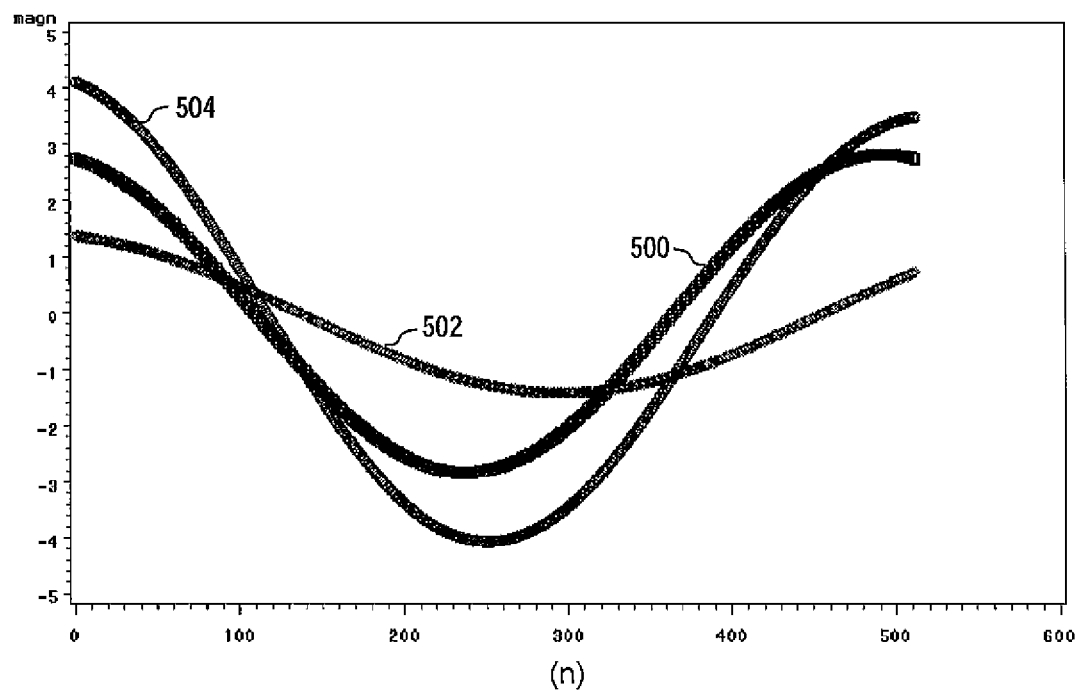
FIG. 5 is a graphical representation depicting the different contributions of both tire harmonics and process harmonics to an exemplary uniformity measurement, where the ordinate represents the magnitude (magn) of the uniformity measurement measured in kilograms force (kgf) and the abscissa represents the data point index (n) as measured around a tire circumference.

Referring now to FIG. 5, a graphical representation shows the different contributions of both tire harmonics and process harmonics to an exemplary uniformity measurement. Consider an example in which there is one strong tire $1^{st}$ harmonic due to different components, for example one of the joint locations 302 and 306 from FIG. 3. If a uniformity waveform was only affected by such tire harmonic, it might look like waveform 500 in FIG. 5. But, now consider that there is a roller effect that occurs as a process harmonic of 1.25 relative to the tire circumference and that also contributes to the uniformity waveform. Such a process harmonic is represented as waveform 502. An actual measured waveform that would include both the tire and process harmonics would appear as waveform 504, a resultant combination of both waveforms 500 and 502. In comparing waveforms 500 and 504, the true tire curve is distorted by the roller process effect, and would have a higher apparent $1^{st}$ tire harmonic magnitude as a result.

Figure 6:
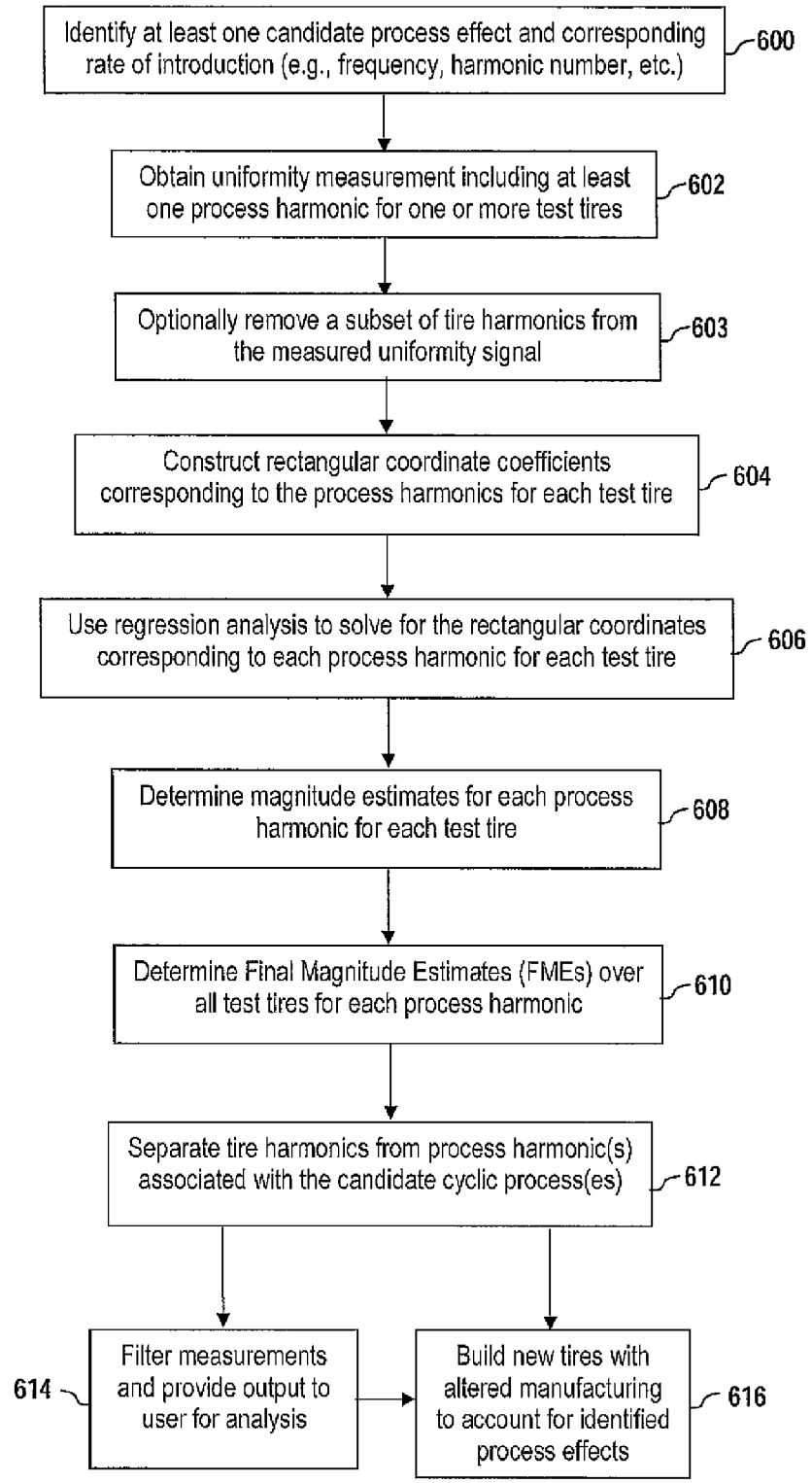
FIG. 6 provides a flow chart of exemplary steps and features in a method of improving tire uniformity through evaluation of process harmonics.

Exemplary embodiments of the present invention provide a way to improve tire uniformity by identifying and optionally extracting the contribution from so-called process effects. Identification of such process harmonics in a uniformity waveform can be used to filter uniformity measurements and/or correct various aspects of the manufacturing process. An example of possible steps to implement such a method is shown in FIG. 6. It should be appreciated that some or all of the steps shown in FIG. 6 may be implemented in different orders than shown in such figure. Suitable variation in the order of such steps is within the scope of the presently disclosed technology.

Referring now to FIG. 6, a first step 600 includes identifying at least one candidate process effect and its harmonic number. The presently disclosed technology can be applied when a single process effect is targeted for analysis, or when multiple process effects are analyzed. Regardless of the number of process effects identified as candidates for analysis under the disclosed techniques, the corresponding candidate process effect(s) should be identified.

The process effect can be expressed in terms of various parameters, including but not limited to the frequency or period of introduction relative to the dimensions of the tire (e.g., tire circumference, radius, diameter, discrete number of measured data points around the tire or the like). The rate of introduction can also be defined by the harmonic number, which is related to the frequency ($\omega$) by the following formula: $\omega = 2\pi h/N$, where h is the harmonic number and N is equal to the number of data points measured around the periphery of a tire when obtaining a uniformity measurement, as in step 602. Frequency ($\omega$), as used herein, is quantified as the Radians per data point measured around a tire. When considering a total number K of multiple process effects (e.g., K total process effects, for k=1, . . . , K), the rate of introduction for each process effect can be defined in terms of its respective harmonic number $h_k$ and/or frequency of introduction $\omega_k$.

It should be appreciated that the candidate process effects may be identified based on certain known features of the manufacturing process, or they may be unknown. If the physical process sources are known, then it may be possible to identify the candidate process harmonic(s) from certain aspects and/or conditions of the manufacturing process. If the process sources are unknown, certain candidate process effects may be identified from initial spectral analysis of the waveform measured in step 602, as described later in further detail.

Referring more particularly to step 600, consider the first example in which at least some features of a candidate process effect are known. For instance, in the example discussed above relative to FIGS. 4A, 4B and 5, the roller having a bump or other non-uniformity that introduces a periodic process effect in a tire manufactured with the resultant tread could be targeted for analysis and ultimate improvement in the manufacturing process. In such example, the harmonic number for the candidate process effect based on this roller condition might be determined from various process conditions, such as but not limited to the speed, diameter, etc. of the tread extrusion process. Referring to the previous example, a user may be able to identify that the tire is imparting some sort of process effect every 1.25 revolutions of the tread portion. The process harmonic can be expressed in any number of fashions either independent of the tire's dimensions (e.g., a fixed length of x meters) or dependent on the tire's dimensions in the form of a parameter such as radius, diameter, circumference or the like at one or more layered locations (e.g., every 1.5 tread revolutions, or iteration of the tire circumference), or dependent on a different dimension used to reference a tire (e.g., the number of data points measured around a tire in one rotation—128 data points, 256 data points, 512 data points, etc.), the harmonic number, or the like.

Referring again to step 600, consider another example in which the harmonic numbers of one or more process effects are unknown. Other useful methods of signal analysis may be used to identify candidate process effects and their corresponding frequencies of introduction. One exemplary method for determining harmonic numbers for a selected number of candidate process effects involves the application of Bayesian spectral analysis techniques to a measured uniformity waveform, for example as obtained in step 602. Additional aspects of such technique are presented with respect to FIG. 7.

An exemplary method for estimating harmonic numbers for various harmonic components of a uniformity waveform, including both tire harmonics and process harmonics, is based on the premise that a uniformity waveform can be written as a sum of sine and cosine terms. For tire harmonics, the frequencies of the sine and cosine terms are integer multiples of $2\pi/N$, where N is the length of the uniformity waveform. In other words, the sines and cosines associated with tire harmonics fit an integer number of times in a single uniformity waveform. In contrast, the process harmonics that contribute to uniformity do not fit an integer number of times in a single waveform. Both the tire harmonics and the process harmonics can be estimated using Bayesian spectral analysis. In general, Bayesian spectral analysis allows for decomposition of a uniformity waveform into a sum of sine and cosine terms, where the frequencies of the sine and cosine terms are parameters to be estimated from the data. The method for estimating the harmonic numbers in a signal with multiple process harmonics is in essence a detrending method. In other words, a trend is estimated from the data then subtracted from the data. This process is iterated until the data appears to be noise.

Figure 7:
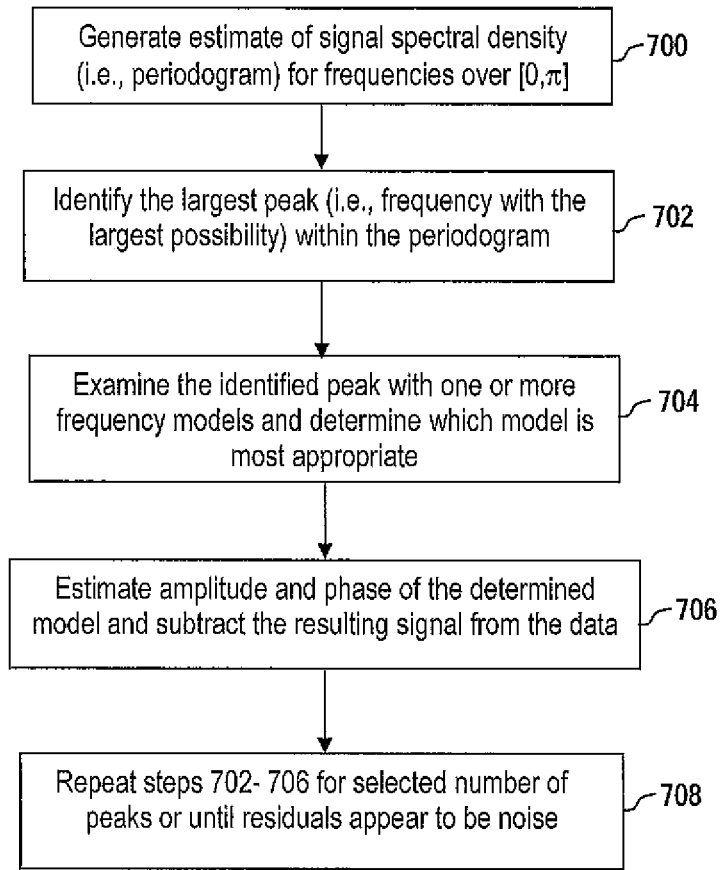
FIG. 7 provides a flow chart of exemplary steps in a process of determining one or more candidate process harmonics in a uniformity waveform.

Referring now to FIG. 7, a first exemplary step 700 in a method of estimating harmonic numbers for various process effects within a uniformity waveform includes generating an estimate for the signal spectral analysis (e.g., an adjusted periodogram) for all integer and non-integer harmonic numbers spanning the continuous interval from [0, max h], where "max h" is a predetermined maximum harmonic number. Although in theory, max h could be any number up to infinity, a value for max h often may be selected to be some value less than about 10, or less than about 4 in various exemplary embodiments of the disclosed technology. The probability of a single process harmonic in the data is given by the t-distribution. In this case, the t-distribution is a function of an adjusted periodogram. The adjusted periodogram is essentially the squared magnitude of the discrete Fourier transform of the data where the harmonic number is allowed to vary continuously between 0 and max h.

In step 702, certain peaks are identified within the adjusted periodogram for subsequent analysis. The peaks within the adjusted periodogram may be identified by any one of a variety of suitable techniques, including but not limited to visual inspection and/or by comparing the amplitude of the adjusted periodogram against various threshold values. In theory, each one of these peaks should correspond to the various tire and process harmonics contributing to the overall uniformity levels within a tire.

The peak identified in step 702 is then examined with one or more process harmonic models in step 704 to determine which model is most appropriate. A one process harmonic model generally may be appropriate when the signal consists of process harmonics that are well separated. In such instances, the process harmonics will be associated with the largest peaks in the adjusted periodogram. A multiple process harmonic model generally may be more appropriate if the signal contains harmonics that are close but distinct. In such cases, each large peak may be better investigated using a multiple process harmonic model. In one embodiment of the present technology, each peak is investigated using at least a one-process harmonic and a two-process harmonic model, although it should be appreciated that other multiple process harmonic models may also be used. In a one-process harmonic model, the t-distribution is maximized at the harmonic number that maximizes the adjusted periodogram of the data, so the adjusted periodogram need only be maximized in order to find the harmonic number with the largest probability. In an in-process harmonic model, the harmonic numbers are estimated by maximizing the generalization of the distribution to in process harmonics. If there is evidence of multiple close harmonics, then these estimates would be used as initial estimates in a full multiple process harmonic analysis of the data.

In more particular embodiments of the disclosed technology, the determination in step 704 of which model is more appropriate is made using a mathematical method known to those of ordinary skill in the art as the "odds ratio." More particularly, the odds ratio is a method for choosing between two candidate models. The odds ratio is defined as the probability of a first model I given the data and prior information divided by the probability of a second model J given the data and prior information. If the odds ratio is much larger than one, then the odds ratio indicates that model I is the better model. If the odds ratio is much smaller than one, then odds ratio indicates that model J is the better model. A value near one indicates that the models are performing substantially equally. If an assumption is made that the models are equally likely, then the odds ratio simplifies to a ratio of the probability of the data given model I to that of model J given the prior information.

Once the best model is chosen in step 704, the magnitude and azimuth of the chosen model (either the one process harmonic, two process harmonic or other analyzed multiple process harmonic model) are estimated in step 706 and the resulting signal is subtracted from the data. The process set forth in steps 702-706 may then be repeated as indicated per step 708 for a selected number of peaks in the adjusted periodogram and/or until the residuals within the spectral analysis signal estimate appear to be noise. Ultimately, a selected number of peaks may be analyzed according to the techniques disclosed herein to identify multiple process harmonics for the various components of a uniformity waveform. Once a sufficient number of peaks have been analyzed, the harmonic numbers for numerous process harmonics may be identified as the harmonic numbers having maximized the t-distribution, where such harmonic numbers do not correspond to integer values.

It should be appreciated that the above technique for identifying candidate process harmonics should be applied to multiple test tires. The total number of test tires for use in the Bayesian spectral analysis of FIG. 7 may be the same or different than the total number (L) of test tires for which subsequent analysis is conducted in the remaining steps of FIG. 6.

Referring again to FIG. 6, it should be appreciated that there may be a practical limit on the discrimination of different process harmonics when multiple process effects are identified as candidates for analysis in step 600. This is because the process harmonics may not be independent. When known process harmonic numbers are close, there is a close correlation between the process harmonics in a measured waveform. As such, the dispersion between the estimated magnitudes of each process harmonic can be quite large. This makes it difficult to identify an accurate estimate of the magnitude for each respective process harmonic unless there is some minimum separation distance between process harmonics. However, if the magnitude of the process harmonic is stable through time, then the central limit theorem establishes that the average of the estimates should have considerably less dispersion than the original estimates. As such, it may be desirable to have a preferred value or ranges of values for the number of test tires (L) over which process harmonic estimates are averaged. Additionally or alternatively, it may be desirable to analyze process effects whose harmonic numbers are separated by a minimum harmonic number of about 0.1 for uniformity waveforms consisting of two harmonics. The calculation of this minimum separation distance can be generalized to waveforms having more than two harmonics In some embodiments, the group of selected test tires subjected to the analysis of FIGS. 6 and 7 are taken from one or more related groups of tires, for example, tires having different stock-keeping unit (SKU) numbers or other unique identifiers but that are made in accordance with similar process techniques. This approach can be especially useful when a candidate process harmonic is very close to another process harmonic and/or close to a tire harmonic within a particular tire group. This near equivalence of harmonic values can cause process harmonic estimates in accordance with the disclosed technology to vary widely from tire to tire. Instead of requiring a relatively large number of one particular group of tires to overcome dispersion, advantages may be found by instead analyzing and combining estimates across several different but related groups of tires which can lead to smaller sample sizes.

The manner in which distinct groups of test tires must be "related" to achieve the benefits described herein are based on certain characteristics of tire manufacturing. It should be appreciated by one of ordinary skill in the art that a single type of manufacturing process may be used to make different groups of tires having one or more different characteristics. A given type of manufacturing process would be one in which the same process elements (rollers, drums, extruders, etc.) are used in the construction of all the dimensions. For example, the same manufacturing process could be used to make one group of tires having a first circumference and another group of tires having a second circumference. In another example, the same manufacturing process could be used with variations in the types of component products, kinds of material mixes, kinds of architectural placements of products, or the like to make one group of tires having a first spring rate and another group of tires having a second spring rate. These different groups of tires are often represented to customers using different SKU numbers. However, there is enough similarity in the manufacturing process of the different tire groups that the same process harmonic(s) will manifest in a cured tire in a similar manner across the different tire groups.

Combining estimates across several tire groups (e.g., related tire SKUs) can be particularly advantageous for reducing the amount of dispersion between process harmonic estimates, especially when the rate of introduction for one or more process harmonics is close to another process harmonic or tire harmonic. These advantages are likely to be realized especially when the different but related groups of tires have different dimensions (e.g., different circumferences.)

An example of how related tire groups having different dimensions can exhibit different rates of introduction for a single process harmonic will now be presented. Consider a manufacturing process in which a particular cooling drum with a circumference of 1.2 meters is used in the construction of several different groups of tires, each group having a different SKU. For example, there may be four different SKU groups that are being produced with tire circumferences of 1.213 meters (in), 1.164 in, 1.216 m, and 1.176 m, respectively. It is reasonable to assume that the amplitude of the process harmonic associated with the given cooling drum is the same for all four SKU groups but that its harmonic number will vary. The process effect from the cooling drum should exhibit itself as process harmonics 1.213/1.2=1.011, 1.164/1.2=0.970, 1.216/1.2=1.013 and 1.176/1.2=0.980 for the four SKU groups, respectively. These different process harmonics would ultimately lead to different rates of introduction for a single candidate process effect as identified in step 600 of FIG. 1.

If the Bayesian spectral analysis depicted in FIG. 7 is used to identify process harmonics across multiple tire groups, whereby the rates of introduction may be slightly different as described above, then the following steps may be taken. First, the candidate process harmonics are aligned for a given candidate process effect, then periodogram magnitudes for each different group are separately calculated, and finally the periodogram magnitudes (weighted by sample size) are averaged over the different groups for each candidate process harmonic. For example, consider a given candidate process effect (e.g., a cooling drum effect) that has a process harmonic of 1.2 for a first SKU group of one-hundred (100) tires and a process harmonic of 1.3 for a second SKU group of fifty (50) tires. Consider further that respective periodogram magnitudes of 10.0 and 15.0 are determined in step 702 for each different tire group. The different peak identification results can then be averaged as (100*10+50*15)/150=11.7 to obtain an average peak identification. The ranking and rejection applied in steps 704 and 706 can then be conducted in a normal fashion using this average peak identification across multiple tire groups.

In alternative embodiments where it may be difficult to align the respective process harmonics for a given candidate process effect, then it is also possible to search independently within a periodogram generated for each different SKU group and then later verify that the resulting peaks in the periodograms are associated with the same process harmonic source. For example, the largest peak within a periodogram for a first SKU group of tires may be identified as having a process harmonic of 1.2 while the largest peak within a periodogram for a second SKU group of tires may be identified as having a process harmonic of 1.3. Knowledge of the differences between SKU groups (e.g., a known relationship of different circumferences in the two different groups) may help a user conclude that the two different process harmonics of 1.2 and 1.3 are similar manifestations of the same cooling drum process effect that show up with slightly different rates of introduction because of the differences in tire circumference across the groups.

Referring still to FIG. 6, at least one additional step 602 is directed to obtaining certain uniformity measurements for the test tires. In particular, exemplary step 602 involves measuring a given uniformity parameter for a set of one or more test tires. It is not necessary that the set of test tires be manufactured in any particular order, only that the test tires are subjected to the candidate process effect(s) that are being analyzed in accordance with the disclosed technology. It should be appreciated that even though all test tires are made in accordance with the same or similar manufacturing process, it is possible that some process effects will not manifest themselves as process harmonics in every tire. For example, a process effect having a harmonic number less than one (1.0) may only present itself in every other tire, every third tire, etc. in a consecutively manufactured set of tires.

In step 602, the measured parameter may correspond, for example, to such uniformity parameters as radial run out (RRO), lateral run out (LRO), mass variance, balance, radial force variation (RFV), lateral force variation (LFV) and tangential force variation (TFV). Examples that discuss selected ones of the above parameters are presented herein for illustrative purposes only and should not be unnecessarily limiting to the present invention. The measured parameter often corresponds to a waveform constructed from a number of data points measured in equally spaced points during one rotation of a tire (e.g., 128, 256, 512 or other number of data points per tire revolution).

Consider a measured uniformity parameter (U) that is obtained at a plurality of equally spaced data points N around a tire such that measurements are obtained at respective data points $U_n$, for n=1, 2, . . . , N. It should be appreciated that the actual $U_n$ values may be conditioned in accordance with a variety of known techniques. For example, the $U_n$ values may be obtained at more than just a single rotation of a tire by averaging the obtained values at each data point during multiple rotations of the tire. In another example, the U, values may be conditioned by subtracting out the average magnitude value of the measured uniformity parameter across all respective data points such that the composite data waveform is centered (e.g., centered along abscissa as shown in FIGS. 1A-1C.)

Although subsequent analysis as described with reference to FIG. 6 may be conducted directly on the raw and/or conditioned uniformity data measured around the tire, an additional optional step 603 may involve subtracting some of the tire harmonics from the raw data. This may be done, for example, by applying Fourier decomposition or regression-based analysis to identify and then subtract out the contributions to the signal based on the tire harmonics. When regression-based analysis is employed, it should be appreciated that the selective removal of some tire harmonics may actually be implemented at the same time as step 606 when using regression techniques to solve for the process harmonic contributions. Although it is possible in theory to remove all the tire harmonics from the measured uniformity data, in practice it may be preferred to subtract out only a subset of the most influential tire harmonics so that there is more substance to the remaining signal for identification of process harmonics. In one exemplary embodiment, the first four harmonics ($1^{st}$, $2^{nd}$, $3^{rd}$, $4^{th}$)) are subtracted out. In other exemplary embodiment, the first ten harmonics are subtracted out. It should be appreciated that any consecutive or non-consecutive subset of influential tire harmonics may be removed in accordance with optional step 603.

Referring still to FIG. 6, a next step 604 in the subject method involves constructing rectangular coordinate coefficients corresponding to the process harmonics for each test tire. These rectangular coordinate coefficients correspond to the sine and cosine terms that can be used to represent the contribution of each process harmonic to each measured data point $U_n$ around a tire. For example, the contribution of the candidate process effects to each data point can be represented by the following equation:

$$U_n = \sum_{k=1}^{K} x_k \cos\left(2\pi h_k \cdot \frac{n}{N}\right) + y_k \sin\left(2\pi h_k \cdot \frac{n}{N}\right), \quad (1)$$

where K is the total number of candidate process harmonics that are selected for analysis and $h_k$ is the non-integer harmonic number for each of the $k^{th}$ candidate process harmonics. N is the length of the measured uniformity waveform, for n=1, 2, . . . , N data points measured around a tire. The rectangular coordinates referred to for each $k^{th}$ process harmonic correspond to $(x_k, y_k)$. As such, the rectangular coordinate coefficients referred to in step 604 correspond to the respective $$\cos\left(2\pi h_k \cdot \frac{n}{N}\right) \text{ and } \sin\left(2\pi h_k \cdot \frac{n}{N}\right)$$

terms for each process harmonic. As such, for K different candidate process harmonics, step 604 will involve calculating (K*N) cosine values and (K*N) sine values.

Referring still to FIG. 6, the next step 606 in the method is to solve for the rectangular coordinates $(x_k, y_k)$ for each $k^{th}$ process harmonic. This is done, for example, using a regression-based analysis that regresses the uniformity waveform for a given test tire onto the sine and cosine terms (i.e., the rectangular coordinate coefficients) calculated in step 604. A linear regression-based signature analysis approach may use known data points to fit the equations set forth by equation (1) above.

Once the rectangular coordinates $(x_k, y_k)$ are determined for each $k^{th}$ process harmonic for a given test tire, the magnitude ($MAG_k$) of each process harmonic is then determined in step 608 according to the following:

$$MAG_k = 2\sqrt{x_k^2 + y_k^2}.$$

It should be appreciated that steps 602-608 are performed for each tire in the set of test tires. This results in a magnitude estimate ($MAG_k$) for each process harmonic k and each test tire l=1, 2, . . . , L, where L is the total number of tires in the set of test tires.

In step 610, a final magnitude estimate ($FME_k$) value is determined for each $k^{th}$ process harmonic over all the tires in the set of test tires. The FME value may generally correspond to a summary value for the magnitude estimates for each process harmonic by considering the average (i.e., mean), median or other summarized value over all test tires. In the instance where the summary value comprises an average value, a final magnitude estimate (FME) for each process harmonic k=1, 2, ..., K is determined over all test tires l=1, 2, ..., L by the following:

$$FME_k = \frac{1}{L}\sum_{l=1}^{L}(MAG_k)_l. \quad (3)$$

When the collection of test tires analyzed in the process of FIG. 6 includes different groups of test tires (e.g., tire groups having different SKUs but related process effects occurring from similarities in manufacturing conditions), then steps 600-608 could be repeated for each different group of tires using a different identified rate of introduction (e.g., harmonic number) for each group. In other words, the harmonic number $h_k$ for the $k^{th}$ given process effect is actually slightly different for the g=1, 2, ..., G different groups of tires. For each of the g=1, 2, ..., G different groups of tires, a different final magnitude estimate $FME_{kg}$ value can be determined. The final magnitude estimate ($FME_k$) over the entire collection of tires, including all different tire groups, can then be taken as a combination of final magnitude estimates for each respective group ($FME_{kg}$). In one particular example, the final magnitude estimate ($FME_k$) over the entire collection of tires is determined as a weighted average of resulting final magnitude estimates ($FME_{kg}$) from each different tire group, as follows:

$$FME_k = \frac{\sum_{g=1}^{G} p_g d_g FME_{kg}}{L}, \quad (4)$$

where $p_g$ represents the number of tires in each of the g=1, 2, ..., G different groups, and where $d_g$ is an adjustment factor (usually related to the spring rate of the tires in each respective group) that helps standardize the magnitudes from different groups. It should be appreciated that the total number of tires in the collection of test tires (L) is equal to the sum of the number of tires in each group g=1, 2, ..., i.e., $$\sum_{g=1}^{G} p_g = L.$$

If construction is similar across the different tire groups (i.e., the different groups have the same spring constant) then the adjustment factors ($d_g$) will be all equal to one, otherwise they will be proportional to the spring constants of the different groups. This approach will result in an efficiency gain even for multiple groups with equal tire circumferences, but an even larger gain when the different groups have varying tire circumferences.

The approach outlined above relative to equation (4) in which a final magnitude estimate is obtained for several different groups of tires, each having a slightly different rate of introduction for the same candidate process effect, has the potential for greatly reducing the variation within process harmonic estimates. The pooled or collective variance for the final magnitude estimate determined over G different tire groups as determined in equation (4) is thus given by:

$$var(FME_k) = \left[\frac{\sum_{g=1}^{G}(p_g-1)*var(d_g FME_{kg})}{\sum_{g=1}^{G}(p_g-1)}\right]/G. \quad (5)$$

Consider an example in which G=4 different tire groups having ten (10) tires each are analyzed, and the process harmonic estimates for each group are each 10%. The estimates across the collection of tires including all four equally sized groups should have a variance of 10%/4=2.5%. In this way, a significant improvement in the overall dispersion of the process harmonic estimates can be achieved with fewer tires per group. This variance improvement will be greater for with initially poorer process harmonic estimates due to a strong overlap of effects (e.g., process and/or tire harmonics having very close rates of introduction).

Another advantage of the multiple group singlet method is to reduce correlation between the harmonics, including both process and tire harmonics, that are being estimated. Correlation between the estimates can cause loss of separation power when the effects are close to one another. If both the tire $1^{st}$ harmonic and a process harmonic of 1.2 start at the same point then the correlation between the cosine terms of this pair of effects over one 128 point waveform is 0.9911, whereas the correlation is 0.94167 for a process harmonic of 1.4. This can mean a significant improvement in the separating power of the method.

In practical applications, one might expect as many as twenty different tire SKU groups to use the same process elements and thus be available for the benefits of a multiple-group tire analysis. The difference in process harmonic numbers over the same twenty groups might be as much as 0.15. Since it may be preferable to estimate process harmonics having more separation from other harmonics within a tire (e.g., closer to minimum harmonic number separation of about 0.1), the use of multiple groups can reduce correlation between adjacent harmonics, thus increasing separation between adjacent harmonics. When a given process harmonic is close to another tire or process harmonic, the multiple tire group approach provides a way to get closer to the ideal separation levels among harmonics.

As mentioned above, the presently disclosed technology can be used to determine estimates for the magnitude of each candidate process harmonic. Those magnitudes can be determined from measurements obtained for a set of test tires including a total number of L tires, where L can be any positive integer number, including one or more tires. Although the disclosed methods can be practiced for any value of L, some exemplary embodiments may incorporate practical features for choosing the number of test tires to optimize the process harmonic estimation process. For example, a minimum value for L may be desirable in order to sufficiently account for variance of process harmonic estimates over different test tires. In addition, a ceiling or maximum value for L may be desirable to limit the cost of tire manufacturing test tires and the computational expense for analyzing exceedingly large sets of test tires.

In one exemplary embodiment of the present subject matter, it is particularly advantageous to determine a preferred number of test tires (L) for analysis in light of the correlation between the different candidate process effects. Unlike Fourier analysis, the process harmonics in the singlet tire regression approach are not necessarily independent. If the correlation between these process harmonics is high, then the variance of the parameter estimates from the regression may be significantly inflated.

In order to address the effects of process harmonic correlation, various statistical quantities can be analyzed to help determine whether the process harmonics are sufficiently separated, or how many test tires (L) should be used to obtain reliable FMEs for the process harmonics. Some statistical quantities that may be utilized for determining the strength of association between the regressors (i.e., the different candidate process harmonics) include, but are not limited to the variance inflation factor (VIF), the condition indices, tolerance, and proportion of variation. In practice, these quantities and others provide respective techniques for estimating the number of waveforms (i.e., test tires) needed for estimating the process harmonic magnitudes within a given margin of error. Additional discussion herein is directed to the use of a variance inflation factor, although it should be appreciated that any number of other suitable statistical quantities may also be used to help optimize the disclosed methods.

The variance inflation factor provides an index that measures how much the variance of an estimated regression coefficient is increased because of correlation between the regressor variables. For a given process harmonic, the variance of the single estimate (i.e., for a single test tire) of the process harmonic magnitude is approximately equal to the (VIF)* (True Parameter Variance). If L is the number of test tires averaged in step 610 to obtain a FME value as described above, then by the central limit theorem the variance of the FME is approximately equal to (VIF)*(True Parameter Variance)/L. If L is equal to the VIF value, then the variance of the FME is approximately the true parameter variance. Based on this relationship, a determination can be made regarding the number of test tires needed for analysis to estimate a given process harmonic magnitude within a given margin of error.

Figure 11:
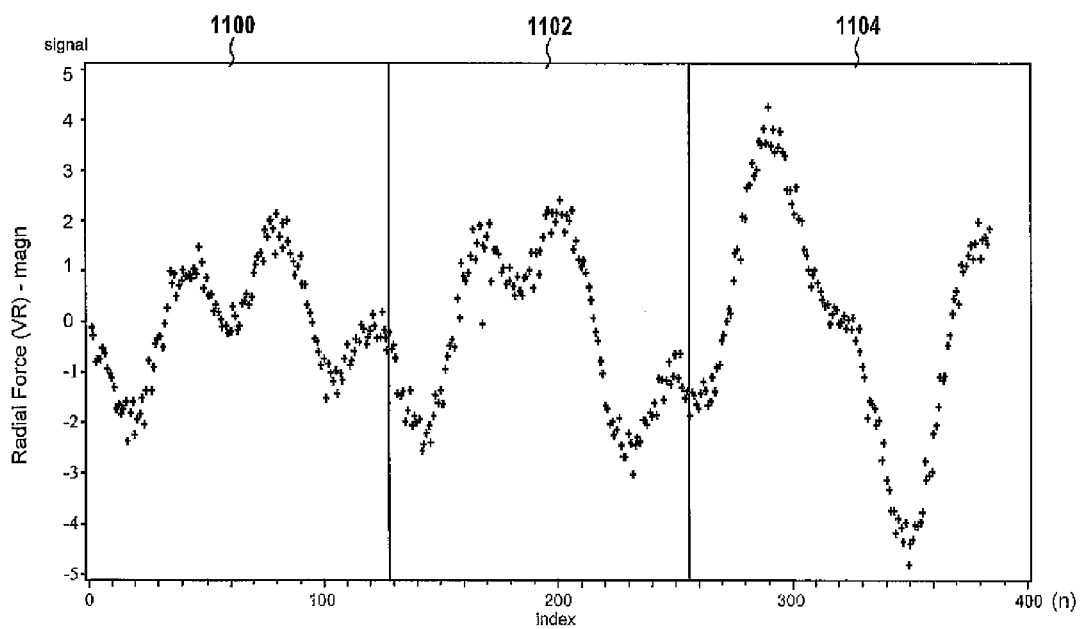
FIG. 11 is a graphical representation of exemplary measured values of the magnitude (magn) of radial force (VR) versus the data point index (n) measured around a tire circumference for three exemplary test tires.

An example of how to determine the number (L) of test tires to analyze or whether candidate process harmonics are sufficiently separated to more accurately implement the disclosed techniques, an example of the use of variance inflation factor (VIF) characterization is now presented, in part with respect to FIG. 11. FIG. 11 provides a graphical illustration of three simulated uniformity waveforms 1100, 1102 and 1104. The waveforms are plotted in FIG. 11 with the uniformity magnitude measured along the ordinate (y-axis) and the index of data points measured around a tire plotted along the abscissa (x-axis). Although the three waveforms 1100, 1102 and 1104 are plotted consecutively relative to one another in FIG. 11, this representation is merely for convenience and does not imply that the waveforms are required to be stacked. In contrast, each waveform stands alone as its own measurement of uniformity data points. The waveforms 1100, 1102 and 1104 are simulated to consist of three process harmonics (i.e., K=3). The process harmonics have respective harmonics numbers as follows: $h_1=1.2$, $h_2=1.3$ and $h_3=3.1$, and respective magnitudes as follows: $MAG_3=3.0$, $MAG_2=2.0$ and $MAG_3=1.0$.

For this set of harmonic numbers, the largest variance inflation factor is calculated to be 55. In other words, the standard deviation of the estimated coefficient for that particular regression term is sqrt(55)=7.4 times larger than it would be if there were no correlation between the regressor variables. By simulating 55 waveforms in this manner, the estimated magnitudes and the standard deviations of the estimated magnitudes can be calculated for each of the three process harmonics. In this example, the standard deviations are 0.217, 0.191, and 0.030 respectively. Practically, this means that typical values for the $h_1$ magnitude estimate from a single regression would be between 2.58 and 3.42. However, if the estimates from the 55 tires are averaged to get final magnitude estimate (FME) values for each process harmonic, the standard deviations of the FME values are 0.217/7.4=0.029, 0.191/7.4=0.026, and 0.03/7.4=0.004 respectively. Hence, typical values for the FME of $h_1$ would be between 2.94 and 3.06. This margin of error when averaged over 55 tires is much more acceptable than the case in which a single test tire is analyzed.

In terms of how the above technique can be applied, the user can input the known frequencies into a software application. The application will compute the variance inflation factors for that set of process harmonic numbers. If the largest variance inflation factor is too large, then the software would tell the user that the harmonic numbers of the candidate process effects are too highly correlated to be estimated using the singlet method. If the largest variance inflation factor is reasonable, then the suggested sample size of test tires (L) may be chosen to be equal to or directly related to the largest variance inflation factor. In other situations, different groups of test tires (e.g., different SKU groups created with a similar manufacturing process) can be used to help reduce the variance inflation factor and/or reduce the total number of test tires (L) in the overall collection of test tires needed to obtain a reasonable estimate for one or more process harmonics in the tires.

Referring again to FIG. 6, once the different magnitudes for the process harmonic(s) are identified, it is possible to separate at least one of those process harmonics from the tire harmonics in a uniformity waveform. As such, step 612 in FIG. 6 involves separating the tire harmonics from the process harmonic(s) associated with the identified candidate process effect(s). A next step 614 involves filtering the uniformity measurements to remove or reduce the effects of the process harmonic(s). For example, given the estimate of a process harmonic for each tire, it is possible to re-estimate the tire harmonics to make the measurements less affected by the data shifts caused by the process effects. In software implementation, the filtering step 614 can be performed separately from step 612 or as part of the extraction of the process harmonic from the tire harmonics. The extracted information (i.e., the process harmonic contribution) and/or the filtered tire harmonic information can then be provided as output to a user for subsequent analysis, including the provision of tire evaluation data via visual or graphical displays, the implementation of tire sorting to fit within certain customer performance limits, etc.

Following through with the example above where the roller process effect is identified as the $4^{th}$ harmonic in a concatenated waveform of data from five tires, the original measurements can be filtered to remove such process effects contributed by the calculated $4^{th}$ harmonic value. For example, a measured waveform can be modified such that it is represented by the sum of all harmonics minus the $4^{th}$ harmonic which was identified as an estimated contribution due to the roller process effect.

After the tire harmonics and the process harmonics are identified and separated in step 612 (and optionally used to filter the tire harmonics of a uniformity measurement in step 614), a final step 616 involves building new tires with altered manufacturing steps or features to account for the process effects. An improved manufacturing process implemented in accordance with step 616 ultimately reduces uniformity dispersion and increases customer yields (i.e., the number of tires having acceptable uniformity limits).

In one example, an altered manufacturing step may involve altering the location of a process effect relative to other tire components (e.g., those creating the tire harmonics—joint overlap locations, press effects, etc.) so that the combined average magnitude of the tire and process effects (determined by vector algebra) is smaller or negligible, thus compensating for the existence of a process effect. Such an alteration may be facilitated by adding a sensor in the tire manufacturing system that marked the position of the roller in each tire build. Alternatively, the roller could be repositioned in the same location for each tire. Knowing the roller position relative to its identified process effect can then be used to easily correct values measured in a process of analyzing and accounting for tire non-uniformities. The addition of an identified constant vector from the process effect contribution could then be corrected by the positioning of another process element. An example of how this vector compensation would work is depicted in FIGS. 8A and 8B.

Figure 8A:
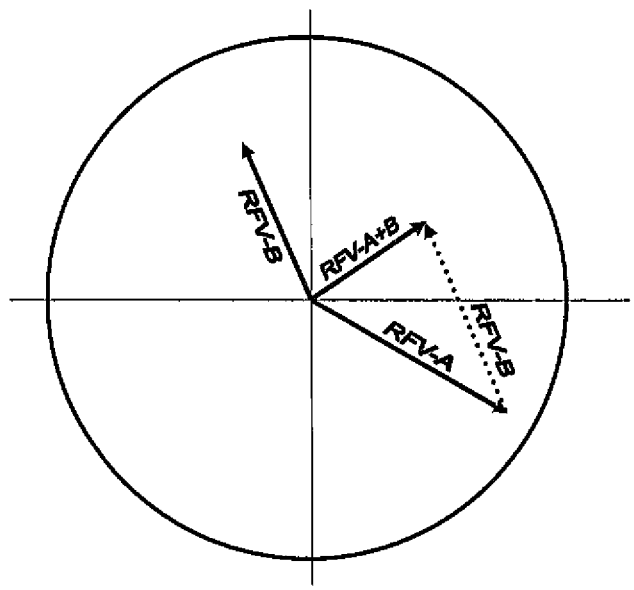
FIG. 8A is a vector plot of resultant radial force variation due to exemplary process elements A and B provided in respective original locations.
Figure 8B:
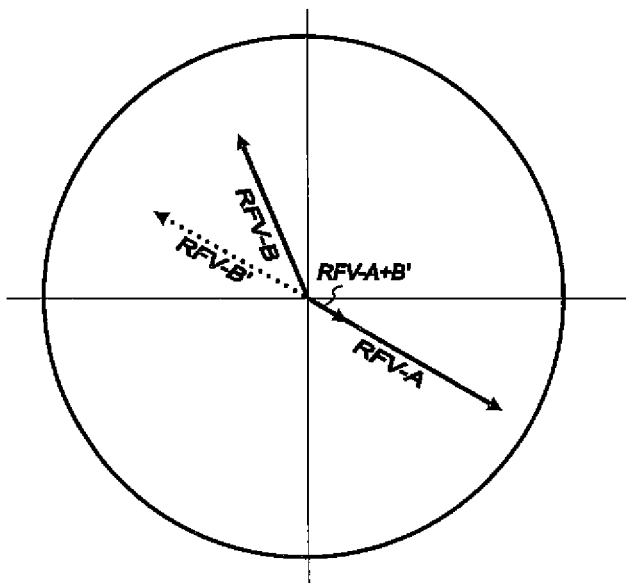
FIG. 8B is a vector plot of radial force variation due to exemplary process elements A and B provided in respective selectively rotated locations.

FIG. 8A illustrates through vector algebra how a measured uniformity parameter (e.g., radial force variation (RFV) can be represented as the sum of respective contributions RFV-A and RFV-B. If RFV-A and RFV-B represent the respective contributions from a tire harmonic contribution (e.g., a press location) and a process harmonic contribution (e.g., a non-uniform roller condition), and the relative angular locations of such elements A and B are known, it is possible to optimize the overall radial force variation by selectively rotating the location of each of the process elements A and B. So, for example, as shown in FIG. 8B, if process element A remains the same but process element B is rotated to a new location represented as vector RFV-B', then the two vector contributions of RFV-A and RFV-B' will add to yield new total vector RFV-A+B'. Comparing the magnitude of the new average vector RFV-A+B' in FIG. 8B to the original RFV-A+B vector from FIG. 8A, one can see that it is possible to reduce the magnitude of the mean RFV value over a set of test tires.

In another example of a potential modification to the tire building process in step 616 of FIG. 6, the process effect itself is altered to reduce or remove its effects. For example, an identified process effect can be corrected to reduce the dispersion if this process effect were still randomly added into each tire. Even when process effects are only reduced as opposed to removed, the cost of correcting tire uniformity will be reduced. For example, rectification procedures such as grinding the tread surface or adding extra material to the tire to improve tire uniformity will be implemented less often and in reduced quantities when required.

In a still further example, the manufacturing process can be adjusted to be robust to the anticipated and identified process effects. For example, uniformity dispersion might rise due to a periodic introduction of temperature variation. One could choose to fix the problem by installing an air-conditioning system in the manufacturing environment. Instead, it might be possible to set the conditions of the building process to work well under all temperatures, even if this is not the best that could be done under an ideal temperature. Since yield is often harmed more by instability and dispersion, this robust (to temperature) process could produce better yield than the perfect process which is never achieved. The robust process or design approach is often a quick, relatively easy way to improve processes without spending money or using resources.

The presently disclosed techniques are advantageous for many reasons. For example, the disclosed technique does not require stacking of waveforms corresponding to tires that are manufactured in some known order. In addition, the set of frequencies that can be examined is arbitrary within certain resolution limits. Finally, the statistical representation of regression-based techniques is readily implemented through statistical software.

Figure 9:
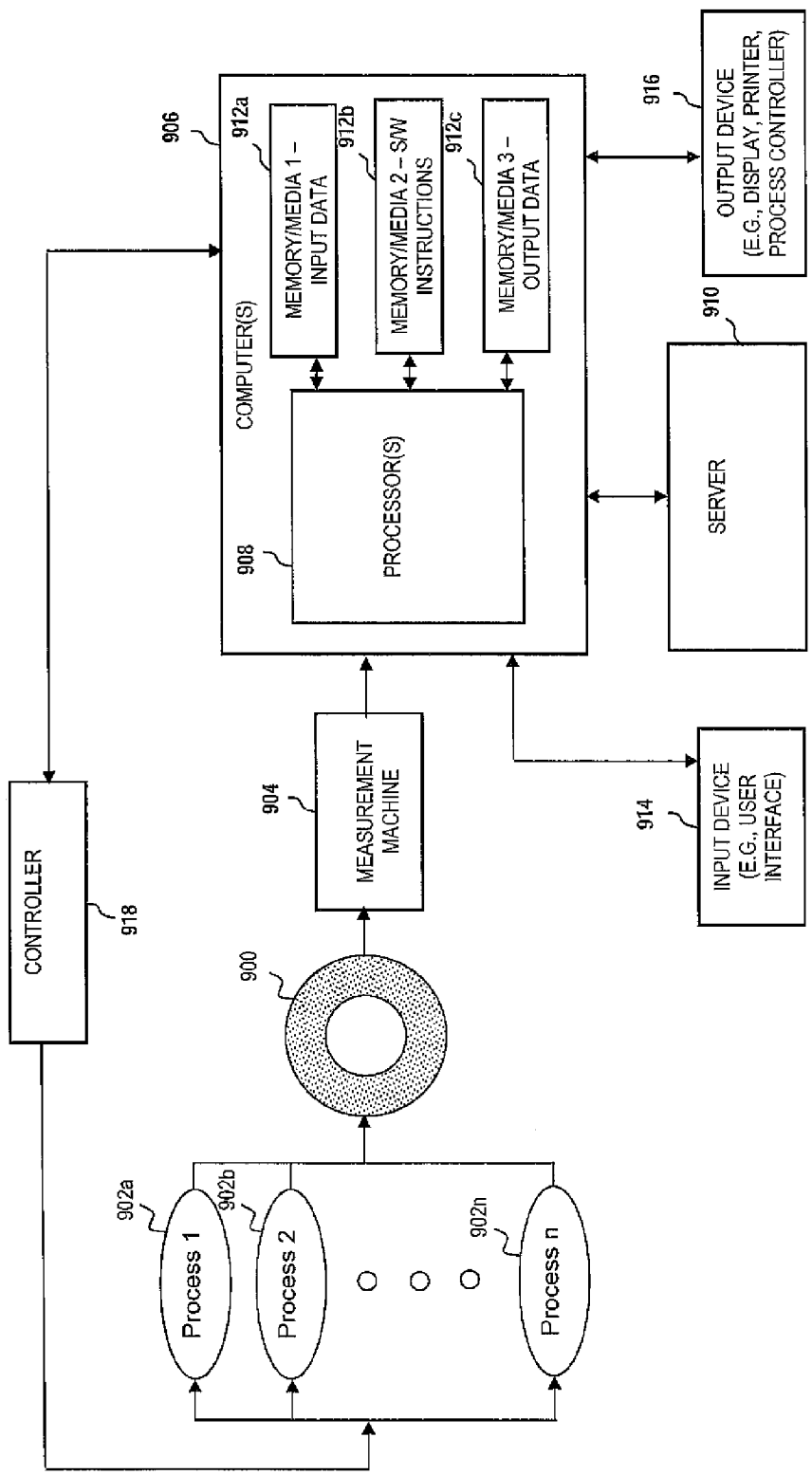
FIG. 9 is a block diagram of exemplary hardware components in a system of the present invention, including various exemplary tire manufacturing, measurement, and post-measurement computer processing components.

Referring now to FIG. 9, a schematic overview of exemplary hardware components for implementing the above-described methodology is illustrated. An exemplary tire 900 is constructed in accordance with a plurality of respective manufacturing processes. Such tire building processes may, for example, include applying various layers of rubber compound and/or other suitable materials to form the tire carcass, providing a tire belt portion and a tread portion to form the tire summit block, positioning a green tire in a curing press, and curing the finished green tire, etc. Such respective process elements are represented as 902a, 902b, . . . , 902n in FIG. 9 and combine to form exemplary tire 900. At least one of the process elements 902 may represent the candidate process effect that is identified for analysis in accordance with the subject methods. It should be appreciated that a batch of multiple tires may be constructed from one iteration of the various processes 902a through 902n. Often, it is such a batch of multiple tires that are measured and tested in accordance with the disclosed uniformity improvement techniques. The multiple model tires are then analyzed to improve the tire building process for subsequently manufactured tires.

Referring still to FIG. 9, a measurement machine 904 is provided to obtain the various uniformity measurements obtained in step 602 of FIG. 6. In general, such a measurement machine may include such features as a mounting fixture on which a tire is mounted and rotated centrifugally at one or more predetermined speeds. In one example, laser sensors are employed to operate by contact, non-contact or near contact positioning relative to tire 900 in order to determine the relative position of the tire surface at multiple data points (e.g., 128 points) as it rotates about a center line. It should be appreciated that any suitable measurement machine capable of obtaining uniformity measurements, such as but not limited to RRO, LRO, RFV, TFV, LFV, balance and the like may be utilized.

The measurements obtained by measurement machine 904 may be relayed to one or more computers 906, which may respectively contain one or more processors 908, although only one computer and processor are shown in FIG. 9 for ease and clarity of illustration. Processor(s) 908 may be configured to receive input data including raw measurements of tire parameters, analyze such measurements in accordance with the disclosed harmonic separation and filtering techniques, and provide useable output such as data to a user or signals to a process controller. Uniformity analysis may alternatively be implemented by one or more servers 910 or across multiple computing and processing devices.

Various memory/media elements 912 may be provided as a single or multiple portions of one or more varieties of computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. Although FIG. 9 shows three separate memory/media elements 912a, 912b and 912c, the content dedicated to such devices may actually be stored in one memory/media element or in multiple elements. Any such possible variations and other variations of data storage will be appreciated by one of ordinary skill in the art.

The computing/processing devices of FIG. 9 may be adapted to function as a special-purpose machine providing desired functionality by accessing software instructions rendered in a computer-readable form stored in one or more of the memory/media elements (e.g., memory/media element 912b). When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits.

Other memory/media elements (e.g., memory/media elements 912a, 912c) are used to store data which will also be accessible by the processor(s) 908 and which will be acted on per the software instructions stored in memory/media element 912b. For example, memory/media element 912a may include input data corresponding to measured composite waveforms obtained from the measurement machine 904 as well as any predetermined tire parameters, such as but not limited to tire radius, tire width, tire summit mass, tire pressure, tire radial stiffness, tire tangential stiffness, tire bending stiffness, tire extensional stiffness, tread locations, general tire data and the like. Such predetermined parameters may be pre-programmed into memory/media element 912a or provided for storage therein when entered as input data from a user accessing the input device 914.

Input device 914 may correspond to one or more peripheral devices configured to operate as a user interface with computer 906. Exemplary input devices may include but are not limited to a keyboard, touch-screen monitor, microphone, mouse and the like.

Second memory element 912b includes computer-executable software instructions that can be read and executed by processor(s) 908 to act on the input data stored in memory/media element 912a to create new output data (e.g., filtered tire harmonic waveforms, extracted process effect contributions, etc.) for storage in a third memory/media element 912c. Selected portions of the output data may then be provided to one or more peripheral output devices 916.

Output device 916 may correspond to a display such as a monitor, screen, or other visual display, a printer, or the like. Another specific form of output device may correspond to a process controller 918. In one embodiment, controller 918 assists the overall tire manufacturing process by coordinating changes to the process elements 902a, 902b, ..., 902n that are optimized in accordance with the disclosed processing analysis. For example, uniformity analysis conducted by computer 906 may determine an optimum arrangement for the angular locations of process elements (e.g., product joint locations, curing press position, etc.) contributing to tire harmonics that will help compensate for a periodically introduced process harmonic. These angular locations are provided as output to the controller 918, which is coupled back to the processes 902a, 902b, ..., 902n in order to implement the determined optimum arrangement of process element angular locations.

EXAMPLE 1

To better appreciate the techniques disclosed herein, particularly those represented in the flow chart of FIG. 6, a numerical example of process effect evaluation is presented based on actual data from a real set of manufactured test tires. In accordance with the subject Example 1, two candidate process effects are identified for analysis, per exemplary step 600 of FIG. 6. These two process effects have respective frequencies of introduction equal to 1.1 times the circumference of the tire and 0.9 times the circumference of the tire. In other words, $h_1=1.1$ and $h_2=0.9$. Per step 602, a uniformity measurement is obtained for one or more test tires. In this particular example, radial force (VR) is measured for $L=12$ different test tires randomly selected from a larger production run.

Figure 10:
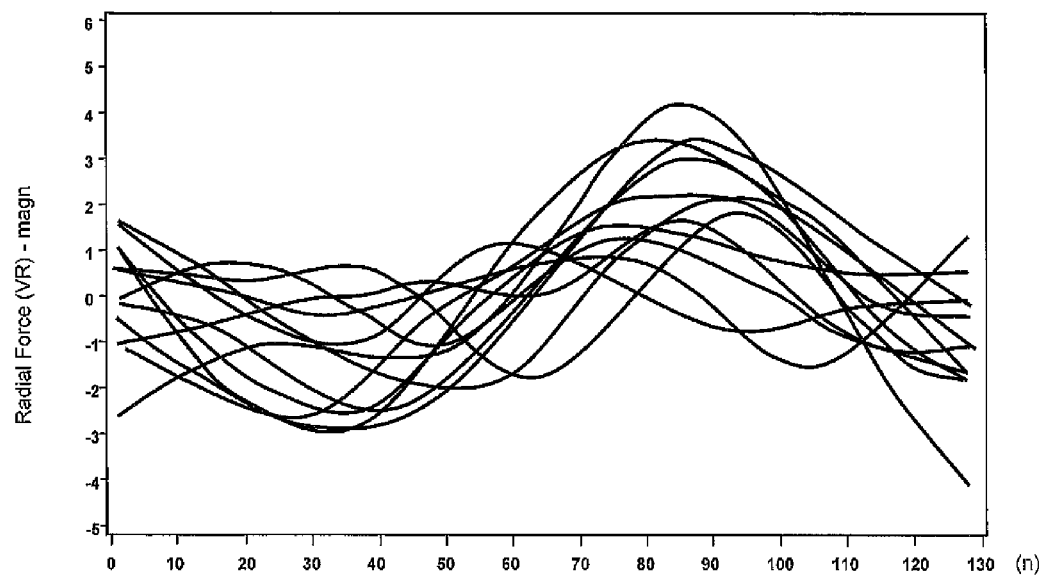
FIG. 10 is a graphical representation of exemplary measured values of the magnitude (magn) of radial force (VR) measured in kilograms force (kgf) versus the data point index (n) as measured around a tire circumference for twelve exemplary test tires.

FIG. 10 shows a graph of exemplary uniformity waveforms for such twelve test tires. Uniformity data values are plotted for $N=128$ data points around each test tire. It is evident from the different uniformity waveforms of FIG. 10 that different tires will often generate quite different uniformity results based on the dispersion among tires and the unpredictability of certain uniformity contributions, such as process effects.

Based on the known harmonic numbers for each candidate process harmonic, the rectangular coordinate coefficients from step 604 can be constructed as indicated in the following matrix. The matrix of coefficients is formed using equation (1) described above, with each column corresponding to the sine and cosine terms at each of the 128 different measured data points for each of the two process harmonics identified by $h_1$ and $h_2$.

$$\begin{pmatrix} \cos(2\cdot\pi\cdot 1\cdot 1.1/128) & \sin(2\cdot\pi\cdot 1\cdot 1.1/128) & \cos(2\cdot\pi\cdot 1\cdot 0.9/128) & \sin(2\cdot\pi\cdot 1\cdot 0.9/128) \\ \cos(2\cdot\pi\cdot 2\cdot 1.1/128) & \sin(2\cdot\pi\cdot 2\cdot 1.1/128) & \cos(2\cdot\pi\cdot 2\cdot 0.9/128) & \sin(2\cdot\pi\cdot 2\cdot 0.9/128) \\ \cos(2\cdot\pi\cdot 3\cdot 1.1/128) & \sin(2\cdot\pi\cdot 3\cdot 1.1/128) & \cos(2\cdot\pi\cdot 3\cdot 0.9/128) & \sin(2\cdot\pi\cdot 3\cdot 0.9/128) \\ \vdots & \vdots & \vdots & \vdots \\ \cos(2\cdot\pi\cdot 128\cdot 1.1/128) & \sin(2\cdot\pi\cdot 128\cdot 1.1/128) & \cos(2\cdot\pi\cdot 128\cdot 0.9/128) & \sin(2\cdot\pi\cdot 128\cdot 0.9/128) \end{pmatrix}$$

The same matrix of rectangular coordinate coefficients for a single tire having the same two process harmonics $h_1=1.1$ and $h_2=0.9$ can also be represented as follows:

$$\begin{pmatrix} 0.9985 & 0.0539 & 0.9990 & 0.0441 \\ 0.9941 & 0.1077 & 0.9960 & 0.0882 \\ 0.9869 & 0.1612 & 0.9912 & 0.1321 \\ \vdots & \vdots & \vdots & \vdots \\ 0.1321 & 0.5877 & 0.8090 & -0.5877 \end{pmatrix}$$

Using the above coordinates, linear regression is used to solve for the rectangular coordinates $(x_k, y_k)$ for each of the $k=1,2$ process harmonics in each of the $L=12$ test tires. This could also be done at the same time as determining the rectangular coordinates for a subset of the tire harmonics. In this particular example, rectangular coordinates were also calculated for the first four tire harmonics, and those tire harmonics are subtracted from the raw data used to solve for the $(x_k, y_k)$ values for the $k=1,2$ process harmonics. The contribution of these first four tire harmonics to the uniformity waveform can also be used to later improve tire uniformity. The rectangular coordinates and corresponding $MAG_k$ values for each candidate process harmonic are shown in Table 1 below.

TABLE 1

Rectangular Coordinates and Magnitude Estimates for k = 2 process harmonics ($h_1$ = 1.1 and $h_2$ = 0.9) and L = 12 test tires.

| Tire #: | $x_1$: | $y_1$: | $x_2$: | $y_2$: | $MAG_1$: | $MAG_2$: |
|---|---|---|---|---|---|---|
| 1 | −0.11393 | 0.18606 | −0.00838 | −0.19961 | 0.436341 | 0.399572 |
| 2 | −0.13089 | 0.31754 | −0.07158 | −0.30330 | 0.686917 | 0.623264 |
| 3 | −0.00881 | −0.05644 | 0.04170 | 0.03500 | 0.114247 | 0.108883 |
| 4 | −0.00040 | 0.04454 | −0.02626 | −0.03196 | 0.089084 | 0.082729 |
| 5 | −0.02195 | 0.00598 | 0.01623 | −0.01721 | 0.0455 | 0.047312 |
| 6 | 0.04971 | −0.00949 | −0.03916 | 0.03606 | 0.101215 | 0.106467 |
| 7 | 0.10407 | −0.15728 | 0.00002 | 0.17331 | 0.377187 | 0.34662 |
| 8 | −0.16197 | −0.25667 | 0.29951 | 0.08768 | 0.607005 | 0.62416 |
| 9 | 0.03257 | 0.10929 | −0.09466 | −0.05872 | 0.22808 | 0.222787 |
| 10 | 0.21407 | −0.44273 | 0.07134 | 0.44145 | 0.983536 | 0.894355 |
| 11 | −0.14440 | 0.26505 | −0.02807 | −0.27383 | 0.603665 | 0.55053 |
| 12 | −0.08603 | 0.16226 | −0.01932 | −0.16626 | 0.367312 | 0.334758 |

Based on the magnitude estimates for each process harmonic identified in Table 1, final magnitude estimates ($FME_1$ and $FME_2$) can be computed by averaging the values over all twelve test tires. The raw averages for each process harmonic correspond to $FME_1$=0.386674 and $FME_2$=0.361786. The raw standard deviation of the twelve individual process harmonic estimates of $MAG_1$ and $MAG_2$ is determined to be 0.290887 and 0.266984, respectively. The standard deviation based on the $FME_1$ and $FME_2$ values is determined to be 0.083972 and 0.077072, which is significantly less than the original standard deviation by a factor of $1/\sqrt{12}$.

EXAMPLE 2

A second example is now presented to provide additional appreciation for an arrangement whereby process harmonic effects are estimated across multiple groups of related tires (e.g., different tire SKU groups made according to similar manufacturing techniques). This example provides simulated data (i.e., test results for hypothetical tires), but exemplifies the types of improvements in uniformity estimation achieved from applying the subject analysis to actual manufactured tires.

In accordance with the subject Example 2, a combined tire grouping approach is used for G=4 different artificially generated tire groups having slightly varied respective rates of introduction for a given first candidate process effect (k=1), namely, the process harmonics ($h_{kg}$) for k=1 and g=1, 2, 3, 4 corresponded to $h_{11}$=1.011, $h_{12}$=0.970, $h_{13}$=1.013, and $h_{14}$=0.980, respectively. Ten tires were simulated per group (i.e., $p_g$=10, g=1, 2, 3, 4) for a total of forty tires (L=40). Simulated random noise was added to each signal of 128 values with a tire first harmonic of 2.828 kgs at 45 degrees and a process harmonic with magnitude 1.414 kgs at randomly chosen azimuths. The resulting summary statistics (average, median, standard deviation) from the singlet regression analyses are shown for each distinct group of tires separately (g=1, 2, 3, 4) and then for the combined average estimate over all test tires. These are compared to the true value to demonstrate the bias and precision of the estimates obtained in this way.

TABLE 2

Comparison of harmonic estimates within distinct groups versus collectively

| Group (g) | Avg magn. (tire) | Avg magn. (process) | Std Error (tire) | Std Error (process) | % gain (tire) | % gain (process) |
|---|---|---|---|---|---|---|
| 1 | 2.76988 | 1.42850 | 0.06635 | 0.03339 | 54.8% | 26.1% |
| 2 | 2.83598 | 1.40537 | 0.05940 | 0.04514 | 49.5% | 45.4% |
| 3 | 2.73552 | 1.38801 | 0.07881 | 0.07214 | 62.0% | 65.8% |
| 4 | 2.84185 | 1.40725 | 0.04789 | 0.05536 | 37.4% | 55.5% |
| Combined | 2.79581 | 1.40728 | 0.02998 | 0.02466 | 50.9% | 48.2% |

Based on the comparison set forth in Table 2, it is evident that on average the new combined estimates are about 48.2% better in precision than any randomly chosen individual group of tires. Theoretically, since one has effectively quadrupled the sample size this gain should be 50% and so the numerical experiment verifies this mechanism. The final estimate for average process harmonic magnitude (1.40728) is only 0.5% off the true value (1.414). Notice, however, that similar gains are not identically achieved across the different respective groups of tires because the process harmonic is less separated from the nearby tire harmonic in some cases than in others. This indicates that it might be possible to improve the method still further by taking a weighted average of the group results with the weights depending on the standard deviation of each group or of the correlations between harmonics.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for improving the uniformity of tires in tire manufacture, comprising the steps of:
   identifying at least one candidate process effect and a corresponding process harmonic number of the at least one candidate process effect;
   using a measurement machine to measure a given uniformity parameter for each testtire in a set of one or more test tires, wherein the obtained uniformity measurements contain one or more tire harmonics and process harmonics corresponding to each said at least one candidate process effect;
wherein the tire harmonics correspond to the component contributions to the obtained uniformity measurements whose sine and cosine terms are integer multiples of $2\pi/N$, where N is the length of a waveform of the measured uniformity parameter, and wherein the process harmonics correspond to the component contributions to the obtained uniformity measurements whose sine and cosine terms are non-integer multiples of $2\pi/N$;
electronically constructing rectangular coordinate coefficients for the sine and cosine terms associated with each said process harmonic;
electronically solving for the rectangular coordinates corresponding to each said process harmonic for each test tire;
electronically estimating the magnitude of each said process harmonic; and
electronically determining a final magnitude estimate for each said process harmonic by summarizing the respectively estimated magnitudes for each said process harmonic across all test tires.

2. The method of claim 1, further comprising:
electronically determining a target number (L) of test tires for which the given uniformity parameter is measured based on the rate of introduction for each said at least one candidate process effect.

3. The method of claim 2, wherein said step of electronically determining a target number (L) of test tires comprises calculating a variance inflation factor for the rates of introduction for each said at least one candidate process effect.

4. The method of claim 1, wherein electronically estimating the magnitude of each said process harmonic comprises determining the square root of the sum of the squared values of the respective rectangular coordinates for each process harmonic and for each test tire.

5. The method of claim 1, wherein electronically determining a final magnitude estimate for each said process harmonic comprises averaging the respectively estimated magnitudes for each said process harmonic across all test tires.

6. The method of claim 1, wherein electronically determining a final magnitude estimate for each said process harmonic comprises taking the median value of the respectively estimated magnitudes for each said process harmonic across all test tires.

7. The method of claim 1, wherein the given uniformity parameter measured for each tire comprises one or more of radial run out (RRO), lateral run out (LRO), mass variance, balance, radial force variation (RFV), lateral force variation (LFV) and tangential force variation (TFV).

8. The method of claim 1, further comprising:
electronically separating at least one process harmonic associated with each of the at least one candidate process effects from the tire harmonics in the obtained uniformity measurements; and
building a new tire to improve uniformity based on knowledge of each separated process harmonic.

9. The method of claim 8, wherein said step of building a new tire to improve uniformity comprises altering the angular location of material components contributing to tire effects relative to the at least one candidate process effect to reduce the combined average magnitude of the tire and process effects.

10. The method of claim 1, further comprising a step of removing a subset of tire harmonics from the obtained uniformity measurements before or at the same time as electronically solving for the rectangular coordinates corresponding to each said process harmonic for each test tire.

11. The method of claim 1, wherein the process harmonic number corresponding to the at least one candidate process effect is identified from known process conditions or from performing spectral analysis of a waveform comprised of the measured values for the given uniformity parameter.

12. The method of claim 1, wherein the given uniformity parameter is measured at a plurality (N) of data points around each test tire, and wherein 2*N different rectangular coordinate coefficients are calculated for each said process harmonic in said step of constructing rectangular coordinate coefficients.

13. The method of claim 1, wherein said step of electronically constructing rectangular coordinate coefficients for each said process harmonic comprises determining values for $$\cos\left(2\pi h_k \cdot \frac{n}{N}\right) \text{ and } \sin\left(2\pi h_k \cdot \frac{n}{N}\right),$$

where $h_k$ is the harmonic number for the $k_{th}$ process harmonic, and n is the index corresponding the numbered data point measured within the total number N of data points at which the given uniformity parameter is measured around each test tire.

14. The method of claim 1, wherein said step of electronically solving for the rectangular coordinates corresponding to each said process harmonic for each test tire comprises using linear regression analysis.

15. The method of claim 1, wherein the set of one or more test tires comprises a plurality of distinct groups of tires, each group having a different characteristic from other groups but all groups being made in a similar manufacturing process such that the same candidate process effect will manifest in a cured tire in a similar manner.

16. The method of claim 15, wherein a corresponding harmonic number for the at least one candidate process effect is identified separately for each distinct group of tires in the set of one or more test tires.

17. The method of claim 15, wherein said step of electronically estimating the magnitude of each said process harmonic is performed for each distinct group of tires such that the final magnitude estimate for each said process harmonic accounts for the magnitudes for each said process harmonic in each distinct group of tires.

18. The method of claim 15, wherein said step of determining a final magnitude estimate comprises determining a weighted average of resulting final magnitude estimates from each distinct tire group in the set of one or more test tires.

19. The method of claim 18, wherein the weighted average across all distinct tire groups accounts for the number of tires in each group as well as a tire spring constant applicable to each group.

20. A system for improving the uniformity of tires in tire manufacture, comprising:
a first memory adapted for storing a plurality of data points for at least one measured uniformity parameter for a set of test tires, wherein the at least one measured uniformity parameter includes one or more tire harmonics and process harmonics, wherein the tire harmonics correspond to the component contributions to the obtained uniformity measurements whose sine and cosine terms are integer multiples of $2\pi/N$, where N is the length of a waveform of the measured uniformity parameter, and wherein the process harmonics correspond to the component contributions to the obtained uniformity measurements whose sine and cosine terms are non-integer multiples of $2\pi/N$;

a second memory adapted for storing software in the form of computer-executable instructions; and at least one processor coupled to said first and second memories and configured to selectively implement the computer-executable instructions stored in the second memory to analyze the concatenated data points stored in the first memory;

wherein said at least one processor implements the computer-executable instructions stored in said second memory in order to construct rectangular coordinate coefficients for the sine and cosine terms associated with each said process harmonic, solve for the rectangular coordinates corresponding to each said process harmonic for each test tire, estimate the magnitude of each said process harmonic, and determine a final magnitude estimate for each said process harmonic by summarizing the respectively estimated magnitudes for each said process harmonic across all test tires.

* * * * *